Jan. 25, 1949.  R. PÉRISSÉ  2,459,960
INTERNAL-COMBUSTION ENGINE
Filed Feb. 10, 1939  3 Sheets-Sheet 1
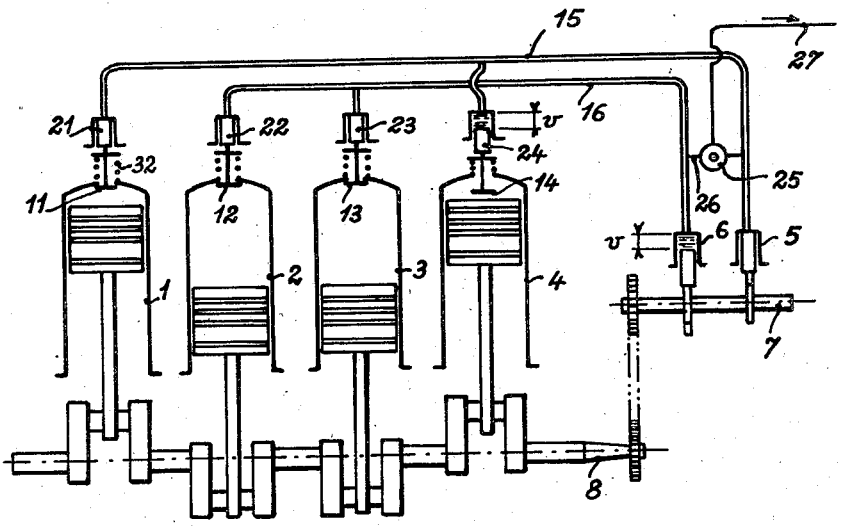
Fig. 1
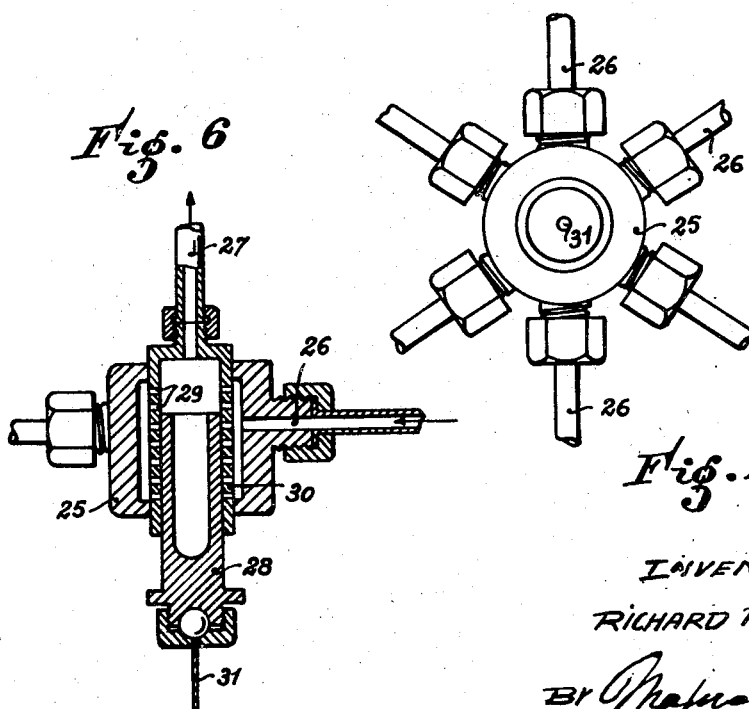
INVENTOR
RICHARD PÉRISSÉ
BY
ATTORNEY

INVENTOR
RICHARD PÉRISSÉ

Jan. 25, 1949.  R. PÉRISSÉ  2,459,960
INTERNAL-COMBUSTION ENGINE
Filed Feb. 10, 1939  3 Sheets-Sheet 3

INVENTOR
RICHARD PÉRISSÉ
BY
ATTORNEY

Patented Jan. 25, 1949

2,459,960

UNITED STATES PATENT OFFICE 2,459,960

INTERNAL-COMBUSTION ENGINE

Richard Périssé, Paris, France

Application February 10, 1939, Serial No. 255,716
In Germany February 11, 1938

Section 3, Public Law 690, August 8, 1946
Patent expires February 11, 1958

7 Claims. (Cl. 123—90)

The invention has for its object a hydraulic control system for distributing or injecting members of engines (distributing valves, slide-valves or sleeves, for example), for which members the resistance to be overcome varies according to the phase of operation of the engine. The invention involves the use, in the manner known per se, of a number of pump bodies provided with pistons for delivering the actuating liquid and of a number of connecting pipes extending to controlling pistons which are connected to said members under control. The invention is essentially characterized by the fact that those of the pipes that extend to controlling pistons for members which perform the same function (for example inlet valves) but which are of opposite phase (that is to say for which the resistance to be overcome passes at the same instant through distinctly different values) and have to operate alternately, are conjugated with each other in such manner that an impulse of the actuating liquid causes each time, owing to the difference of the forces to be overcome, the movement of only some of the members (for instance the lifting of certain inlet valves) which are supplied by the same pipe and not of the others.

The general hydraulic control system, for example for the valves of an engine, is thus considerably simplified and lightened without its being necessary to interpose any dividing member in the pipes.

The invention can be applied, for instance to a group of distributing members, such as inlet valves.

The invention can effect, either solely the opening of the valves or the like, or both the opening and the closing of same. In this latter case, the pump bodies used are double acting and are connected together through a single pipe (which supplies all the pump bodies).

Finally, for simultaneously adjusting the stroke of all the members to be controlled, or only of a group of same, in spite of the use of economical pumps having a constant stroke and output, according to my invention I place, on those of the connecting pipes which are to be controlled, a slide-valve which produces a variable leakage of the transmitting fluid, which leakage I control by moving said slide-valve relatively to a shell, thereby gradually uncovering a slot of appropriate shape or a series of spaced holes, each slot or series of holes being equivalent to respective pipe connections, thus regulating the cross section of the passage for the fluid.

Moreover, my invention will be better understood if reference be had to the accompanying drawings which show, solely by way of example, the application of my invention to the control of the inlet valves of a four-cylinder engine.

In said drawings:

Figs. 1, 2 and 3 show three longitudinal diagrammatical sections of an engine, in three different embodiments;

Fig. 6 shows a section of the member producing the controlled leakage; and

Fig. 7 shows a plan view of the connections of the pipes to the aforesaid member.

Figure 2:
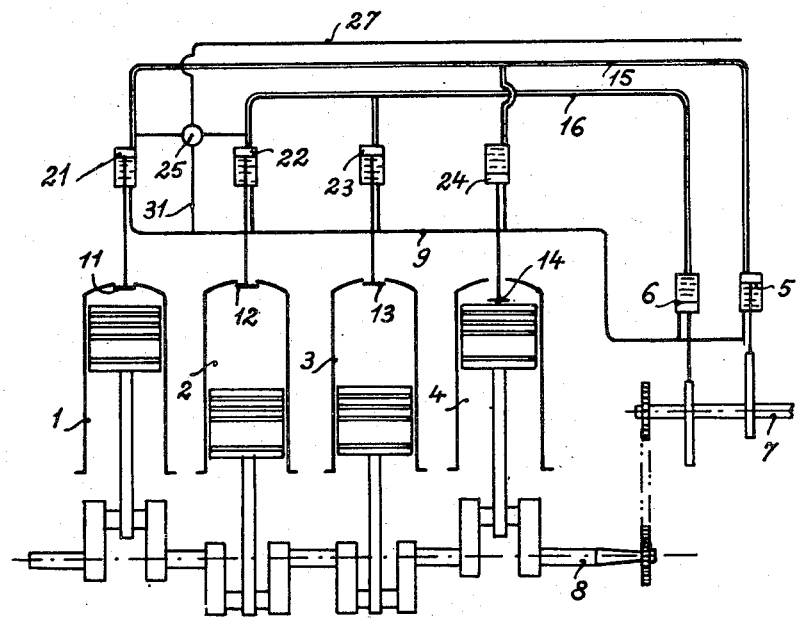

I will consider a usual four-cylinder engine having cylinders 1, 2, 3, 4 (Fig. 1), the respective inlet valves 11, 12, 13, 14 of which are connected to respective actuating pistons 21, 22, 23 or 24 of the hydraulic transmission system.

The pistons of the delivery pump 5, 6 are connected, in the manner known per se, through shaft 7 to the rotary shaft 8 of the engine.

In the embodiment of Fig. 1, I have assumed that the hydraulic transmission system is only intended to lift valves. In this case, the delivering and receiving pumps used are single acting.

According to my invention, the delivering pump comprises only two pump bodies 5, 6 for controlling the inlet valves, the same body 5, for example, being conjugated by pipe 15 with the operative face of two pressure responsive devices having pistons 21, 24 pertaining to two different engine cylinders 1, 4 (similarly, the pump body 6 is conjugated, by the pipe 16, with the pressure responsive devices having pistons 22, 23).

When, for example, the cylinder 1 is at the explosion stroke, the cylinder 4 is at the end of the exhaust stroke. There is therefore a higher pressure in the cylinder 1 than in the cylinder 4, so that the hydraulic impulse, which comes at this instant from the pump body 5, causes the valve 14 to lift or leave its seat, whereas the valve 11 remains closed.

The volumes involved by the movement of the delivery pistons 5, 6 and the receiving pistons 21, 22, 23, 24 are all equal, since the volume $v$ of the liquid column displaced, for example by 5, causes the displacement of an identical liquid volume $v$ which lifts, according to the case, either device 24 or 21.

For controlling the inlet valves of a four-cylinder engine, the number of connecting pipes will therefore be reduced, according to the invention, to two bifurcated pipes 15, 16, that is to say, each having two branches.

A similar device can be used for actuating the exhaust valves, the operation of which is possible if said valves open outwardly responsive to the action of the hydraulic push rod, and close under the action for example of a retracting spring.

The return of the valves (or other distributing members) may be produced (Fig. 1) by known means such as a retracting spring 32.

When it is desired to obtain by hydraulic control, not only the lifting but also the return of the distributing members, I make use of double acting pumps and each side of the actuating pump body, respectively 5 or 6, is connected (Fig. 2) to each side of each of the receiving pump bodies 21, 22, 23, 24 by means of a direct pipe without any intermediate dividing member.

According to my invention, the pipes controlling the return are merged into a single manifold 9 which connects together not only all actuating pistons 21, 22, 23, 24, but also the delivery pump bodies 5, 6.

Substituting for the pipes a single manifold is made possibly by the fact that the return of a distributing member can only take place if it has been previously moved and if the pressure of the fluid of the actuating pump decreases.

This simplified return control can be advantageously applied in the case of distributing members such as slide-valves, sleeves, etc.

Figure 3:
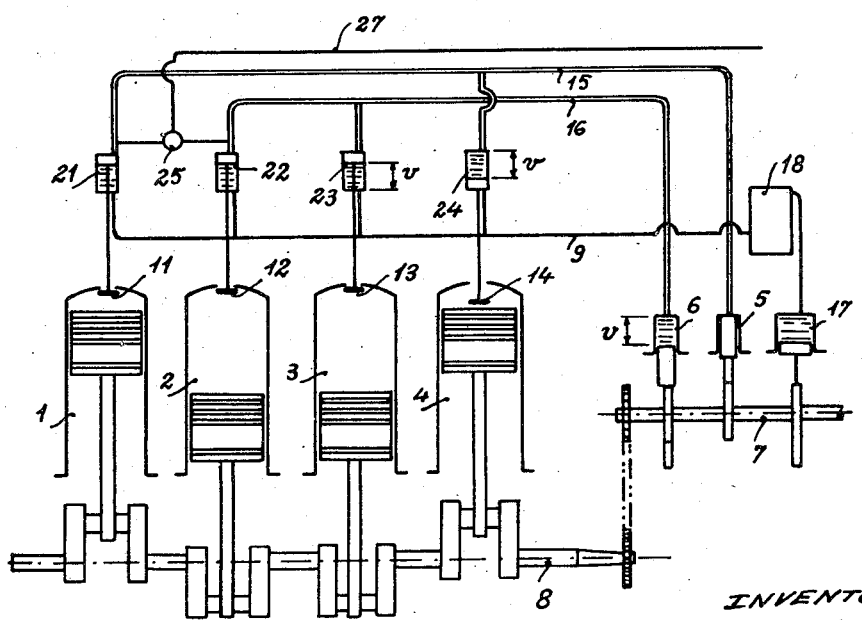

Another embodiment of my invention (Fig. 3) consists in supplying the single manifold 9 by means of a special pump 17, the delivery pump bodies 5, 6 being of the single acting type. In this case, the pump 17 which produces the return of the valves may either operate with modulated variable pressure so as to obtain the same law of pressure as that obtained by conjugating 5 and 6, or supply the single manifold 9 with a pressure which is kept constant by means of a pressure accumulator 18.

Figure 4:
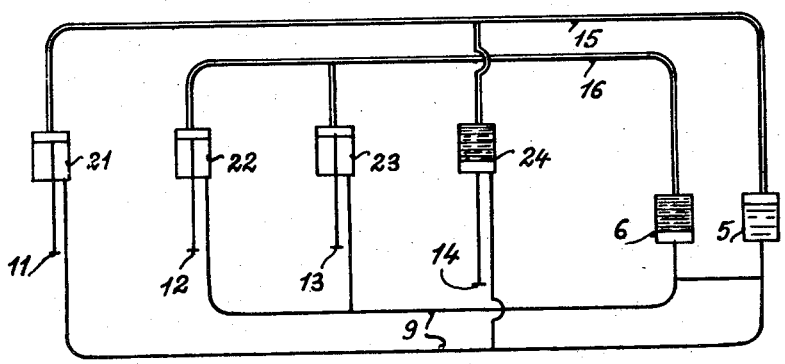
Figs. 4 and 5 are two diagrams showing the fluid distributing system in two successive phases.
Figure 5:
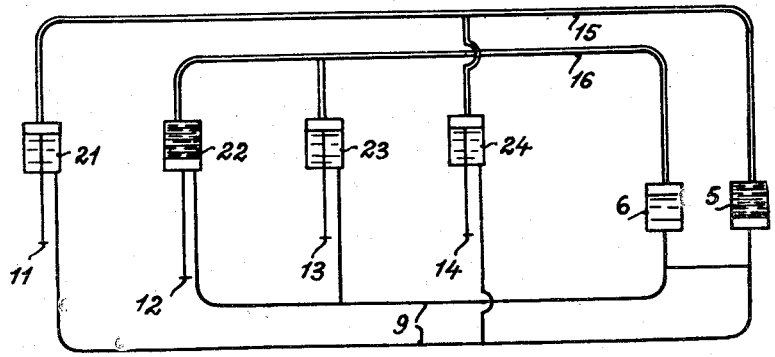

The operation of my device can be clearly seen from Figs. 4 and 5 which relate to the case of a four-cylinder engine in which the order of ignition is 1, 3, 4, 2. In Fig. 4, the piston of the delivery pump body 5 has driven a unit quantity of liquid into the receiving pump body 24 and lifted the valve 14. At the next stroke (Fig. 5), it is the turn of the valve 12 to be lifted owing to a quantity of liquid being sent into cylinder 22 by pump 6. But simultaneously, the rearward face of the piston 5 has driven a quantity of liquid towards the rearward face of piston in cylinder 24, thereby causing the valve 14 to close.

In all the cases, since the pumps used have constant strokes and outputs (and are therefore economical to manufacture), a substantially continuous variation of the useful stroke of the receiving pistons is obtained, and consequently the variation of the lift of the valves, by means of a single member 25 (Figs. 1, 2 and 3) which produces a variable and controlled leakage of the transmitting fluid, which leakage will be equal for all the connecting pipes.

Said member preferably consists (Fig. 6) of a cylindrical slide-valve 28 which is actuated by appropriate means (cable or rod system 31) so as to slide in a shell 25 and gradually uncover a slot of appropriate shape or a series of holes 29 provided in a mesh or wicket element 30 arranged inside said shell. The number of holes or openings 29 are made to correspond at least to the number of inlets 26 of pipes to be controlled.

From the bottom of the shell 25 leads a pipe 27 returning to the supply reservoir (not shown) of the pumps 5, 6.

It is possible, on the other hand, as shown in Fig. 1, to locate the member 25 near the pumps 5, 6, which may offer an advantage as regards compactness.

It will be readily understood that when the slide-valve 28 is at the end of the shell 25, no leakage occurs or at any rate such leakage may be as small as desired and that consequently the maximum lift is imparted to the valves (operation on full load).

By removing the slide-valve 25, an increasing length of slot or an increasing number of holes 29 is uncovered in front of each pipe inlet 26 and thereby a more or less large leakage of the fluid is produced through the pipe 27 returning to the supply reservoir of the pumps, which has the effect of gradually reducing the lift of the valves and also the power of the engine.

In the case in which the hydraulic control is used also for obtaining the return of the valves (Fig. 2), an additional inlet 31 connected to the manifold 9 is provided on the leak member 25. It is to be understood that the holes or orifices 29 in member 25 are so small that they will oppose to the liquid and cause a considerable loss of charge which produces in the conduits a sufficient pressure to permit closure and return of the respective valve.

It is furthermore obvious that the methods for carrying out the invention may vary within fairly wide limits according to the type of engine, the number of cylinders, the location of the valves, etc., without for that reason departing from the spirit of my invention, within the scope of the appended claims.

I claim:

1. In an internal combustion engine comprising at least two cylinders each having an inlet valve, said cylinders being operated in synchronism and with a phase difference whereby different pressures will obtain within said cylinders at least over a substantial portion of a cycle of operation, in combination, a source of operating fluid, an actuating member for each of said valves, said member being responsive to pressure by said operating fluid to lift the associated valve from its seat whenever said fluid pressure bears a predetermined relationship with the internal pressure of the respective cylinder, a common conduit for said fluid connecting said actuating members in parallel to said source, and means operative at the source end of said conduit to put said fluid under pressure during said portion of a cycle whereby only the valve of the cylinder having the lower instantaneous internal pressure will operate.

2. In an internal combustion engine comprising a shaft powered by at least two cylinders each having an inlet valve, said cylinders being operated in phase opposition so that the pressure within one cylinder will substantially exceed that within the other cylinder during a first portion and vice versa during a second portion of a cycle of operation, in combination, an actuating member for each of said valves, a pair of chambers, an extremity of each of said members being slidably held in a respective one of said chambers, a conduit having two outlets each opening into a respective one of said chambers, a pump adapted to apply hydraulic pressure to said members by way of said conduit and said respective chambers, said hydraulic pressure tending to lift said valves from their seats against the internal pressure of the respective cylinder, and means under the control of said shaft arranged to actuate said pump during said first and during said second portion of a cycle whereby only the valve on the respective cylinder having the lower instantaneous internal pressure will operate each time.

3. In a four-stroke internal combustion machine having a shaft powered by at least four cylinders wherein the intake stroke of a first cylinder coincides with the compression stroke of a second, the expansion stroke of a third and the exhaust stroke of a fourth cylinder, in combination, an inlet valve on each of said cylinders, first, second, third and fourth pistons for actuating the valves of said first, second, third and fourth cylinder, respectively, a first pair of chambers, the extremities of said first and fourth pistons being slidably held in respective chambers of said first pair, a second pair of chambers, the extremities of said second and third pistons being slidably held in respective chambers of said second pair, a first conduit having two outlets each opening into a respective chamber of said first pair, a second conduit having two outlets each opening into a respective chamber of said second pair, a first pump adapted to force an operating fluid into said first pair of chambers by way of said first conduit so as to tend to lift the valves of said first and fourth cylinders from their seats against the internal pressure of said first and fourth cylinder, respectively, a second pump adapted to force an operating fluid into said second pair of chambers by way of said conduit so as to tend to lift the valves of said second and third cylinders from their seats against the internal pressure of said second and third cylinder, respectively, means under the control of said shaft for actuating said first pump during the respective intake strokes of said first and fourth cylinders, means under the control of said shaft for actuating said second pump during the respective intake strokes of said second and third cylinders, and means for returning each valve onto its seat at the end of the intake stroke of the respective cylinder.

4. In an internal combustion machine, the combination according to claim 3 further comprising an adjustable leakage control member, means permanently connecting said control member to both of said conduits in parallel, and a source of operating fluid connected to both of said pumps so as to compensate for fluid lost by way of said control member.

5. In an internal combustion machine, the combination according to claim 4 wherein said leakage control member comprises a shell having a plurality of spaced openings, inlet means communicating with said openings, outlet means communicating with the interior of said shell, and a slide valve displaceable within said shell to cover a variable number of said openings whereby the degree of communication between said inlet and outlet means may be varied.

6. In an internal combustion machine, the combination according to claim 3 wherein each of said pumps comprises a cylinder and a piston reciprocable therein and wherein said valve returning means comprises a single manifold connecting each of said chambers with each of said pump cylinders at points cut off by the respective pistons from direct communication with said first and second conduit, respectively.

7. In an internal combustion machine, the combination according to claim 3 wherein said valve returning means comprises an additional pump controlled by said shaft and a single manifold arranged to conduct operating fluid from said additional pump toward the rearward faces of all of said pistons in parallel.

RICHARD PÉRISSÉ.

No references cited.